United States Patent
Soma et al.

(10) Patent No.: US 11,323,935 B2
(45) Date of Patent: May 3, 2022

(54) CROWDSOURCED NETWORK IDENTIFICATION AND SWITCHING

(71) Applicant: Dell Products, L.P., Round Rock, TX (US)

(72) Inventors: Dileep Kumar Soma, Austin, TX (US); Anantha K. Boyapalle, Cedar Park, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 132 days.

(21) Appl. No.: 16/898,812

(22) Filed: Jun. 11, 2020

(65) Prior Publication Data
US 2021/0392556 A1 Dec. 16, 2021

(51) Int. Cl.
| H04W 4/00 | (2018.01) |
| H04W 36/14 | (2009.01) |
| H04W 36/32 | (2009.01) |
| H04W 36/30 | (2009.01) |
| H04W 36/38 | (2009.01) |

(52) U.S. Cl.
CPC .......... *H04W 36/14* (2013.01); *H04W 36/30* (2013.01); *H04W 36/32* (2013.01); *H04W 36/38* (2013.01)

(58) Field of Classification Search
CPC ..... H04W 36/14; H04W 36/30; H04W 36/32; H04W 36/38
USPC ......................................................... 370/331
See application file for complete search history.

(56) References Cited

U.S. PATENT DOCUMENTS

| 8,794,971 | B2 * | 8/2014 | Feng .................. G09B 7/00 434/107 |
| 8,972,175 | B2 * | 3/2015 | Annapureddy .. G08G 1/096791 701/423 |
| 9,357,354 | B2 * | 5/2016 | Palanki ................ H04W 64/00 |
| 9,503,858 | B2 * | 11/2016 | Palanki ................ H04W 4/025 |
| 9,686,768 | B2 * | 6/2017 | Palanki ................ H04W 4/027 |
| 9,736,699 | B1 * | 8/2017 | Rao ........................ H04W 4/80 |
| 9,794,744 | B1 * | 10/2017 | Gu ........................ H04W 12/06 |
| 9,832,615 | B2 * | 11/2017 | Palanki ................ G01C 21/206 |
| 10,341,853 | B2 * | 7/2019 | Edge ...................... G01S 5/0252 |
| 10,726,503 | B2 * | 7/2020 | Song .................. G06Q 20/3278 |
| 10,771,522 | B2 * | 9/2020 | Asnis .................. H04L 65/1089 |
| 2014/0207450 | A1 * | 7/2014 | LaVoie ............... H04N 21/4542 704/235 |
| 2016/0364423 | A1 * | 12/2016 | Dandekar ........... G06F 16/2272 |
| 2017/0325113 | A1 * | 11/2017 | Markopoulou ....... H04W 12/35 |
| 2018/0025235 | A1 * | 1/2018 | Fridman ............ G06K 9/00791 382/103 |
| 2018/0152848 | A1 * | 5/2018 | Egner .................... H04W 76/18 |
| 2018/0160441 | A1 * | 6/2018 | Egner ............... H04W 72/1231 |

(Continued)

*Primary Examiner* — Amancio Gonzalez
(74) *Attorney, Agent, or Firm* — Fogarty LLP (57) ABSTRACT

Systems and methods for providing crowdsourced network identification and switching are described. In some embodiments, an Information Handling System (IHS) may include a processor and a memory coupled to the processor, the memory having program instructions stored thereon that, upon execution, cause the IHS to: collect characteristics of a first network accessed by an application executed by the IHS at a given location, transmit information related to the characteristics, the application, and the location to a crowdsourcing server, and receive a message from the crowdsourcing server to switch from the first network to a second network.

15 Claims, 4 Drawing Sheets

(56) References Cited

U.S. PATENT DOCUMENTS

| | | | |
|---|---|---|---|
| 2018/0167825 A1* | 6/2018 | Egner | H04W 28/08 |
| 2018/0167948 A1* | 6/2018 | Egner | H04W 76/16 |
| 2018/0184231 A1* | 6/2018 | Egner | H04W 24/10 |
| 2018/0184330 A1* | 6/2018 | Egner | H04L 43/0876 |
| 2018/0234901 A1* | 8/2018 | Suh | H04W 36/32 |
| 2019/0251952 A1* | 8/2019 | Arik | G10L 13/033 |
| 2020/0107338 A1* | 4/2020 | Egner | H04W 72/1215 |
| 2020/0137688 A1* | 4/2020 | Gulbay | H04W 4/00 |
| 2020/0410387 A1* | 12/2020 | Fox | G06K 9/6264 |
| 2021/0133298 A1* | 5/2021 | Andrews | H04L 63/1433 |
| 2021/0286478 A1* | 9/2021 | Cardinal | G06F 11/3438 |
| 2021/0349994 A1* | 11/2021 | Ravindra | G06F 16/9535 |

* cited by examiner

CROWDSOURCED NETWORK IDENTIFICATION AND SWITCHING

FIELD

This disclosure relates generally to Information Handling Systems (IHSs), and more specifically, to systems and methods for providing crowdsourced network identification and switching.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through one or more networks to perform certain processing tasks. Generally, client IHSs establish communications with server IHSs to retrieve and store data. Different types of networks support different types of communication at different data transfer rates. Examples of networks include, but are not limited to the Internet, the public switched telephone network (PSTN), and the wireless radio networks of cell phone telecommunication providers.

In some situations, an IHS user may have the option to select and connect to different networks and/or different types of networks, such as open WiFi (e.g., at an airport, coffee shop, etc.), home WiFi, corporate wired, cellular networks, etc.

Particularly with respect to our remote workforce, the inventors hereof have determined that it would be advantageous for users to know which among a plurality of available networks to connect to when outside of their offices in order to be most productive (e.g., based upon Quality-of-Service (QoS) metrics, level of trust, reliability, etc.). To address these, and other issues, the inventors hereof have developed systems and methods for providing crowdsourced network identification and switching.

SUMMARY

Embodiments of systems and methods for providing crowdsourced network identification and switching are described. In an illustrative, non-limiting embodiment, an Information Handling System (IHS) may include a processor and a memory coupled to the processor, the memory having program instructions stored thereon that, upon execution, cause the IHS to: collect characteristics of a first network accessed by an application executed by the IHS at a given location, transmit information related to the characteristics, the application, and the location to a crowdsourcing server, and receive a message from the crowdsourcing server to switch from the first network to a second network.

In some cases, the first and second networks may be selected from the group consisting of: a WiFi network, an Ethernet network, and a cellular network. The characteristics may be selected from the group consisting of: throughput, packet size, latency, round-trip time (RTT), Received Signal Strength Indicator (RSSI), bit error rate, access point identification, network access address, and security protocol.

To switch from the first network to the second network, the program instructions, upon execution, may cause the IHS to receive an identification of an access point associated with the second network. The crowdsourcing server may be configured to receive other characteristics from other IHSs and to select the second network in response to a determination that the second network accommodates traffic generated by the application at the given location with a higher Quality-of-Service (QoS) than the first network, where the determination is based at least in part upon an evaluation of the other characteristics received from the other IHSs.

Moreover, the program instructions, upon execution, may cause the IHS to: transmit time-of-day information to the crowdsourcing server, wherein the crowdsourcing server is configured to select the second network based, at least in part, upon the time-of-day information. Additionally, or alternatively, the program instructions, upon execution, may cause the IHS to: transmit IHS power consumption information to the crowdsourcing server, where the crowdsourcing server is configured to select the second network based, at least in part, upon the IHS power consumption information.

Additionally, or alternatively, the program instructions, upon execution, may cause the IHS to: transmit IHS posture information to the crowdsourcing server, where the crowdsourcing server is configured to select the second network based, at least in part, upon the IHS posture information. Additionally, or alternatively, the program instructions, upon execution, may cause the IHS to: transmit, to the crowdsourcing server, information about a user's physical distance from the IHS, where the crowdsourcing server is configured to select the second network based, at least in part, upon the user's physical distance from the IHS.

In some cases, the program instructions, upon execution, may cause the IHS to: detect a change in at least one of: a characteristic of the second network, a state of the application, or a current location; transmit an indication of the change to the crowdsourcing server; and receive another message from the crowdsourcing server to switch from the second network to: the first network or a third network.

In another illustrative, non-limiting embodiment, a memory device may have program instructions stored thereon that, upon execution by a processor of a crowdsourcing server, cause the crowdsourcing server to: receive characteristics of a first network accessed by an application executed by an IHS at a given location; and transmit a message to the IHS to switch from the first network to a second network. In yet other illustrative, non-limiting embodiment, a method may include receiving, at a crowdsourcing server from an IHS, characteristics of a first network accessed by an application executed by the IHS at a given location, and transmitting, from the crowdsourcing server to the IHS, an instruction to switch from the first network to a second network.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Systems and methods described herein provide crowdsourced network identification and switching. In various embodiments, systems and methods described herein may: recognize the networks being accessed at a particular location, use instrumentation to identify characteristics of a particular network when being accessed by an application, map networks to their characteristics, and save this data in the cloud to be accessed by other IHSs.

Techniques discussed herein may apply supervised machine learning (ML) algorithms on crowdsourced data collected. Each network or access point (AP) may be treated as a class ("n") at a particular geo-location, and model parameters based on learning may be generated. These parameters may be accessed by other IHS and utilized to find the best network around them, such that each IHS and/or application can seamlessly switch its connection to the best available, known connection.

Moreover, systems and methods described herein may constantly or periodically aggregate characteristics of all networks at a given location across all users, to continuously update and improve previously learned models. In some cases, these systems and methods may serve as a way of flagging untrusted networks that have security gaps, so that other users can leverage that information.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
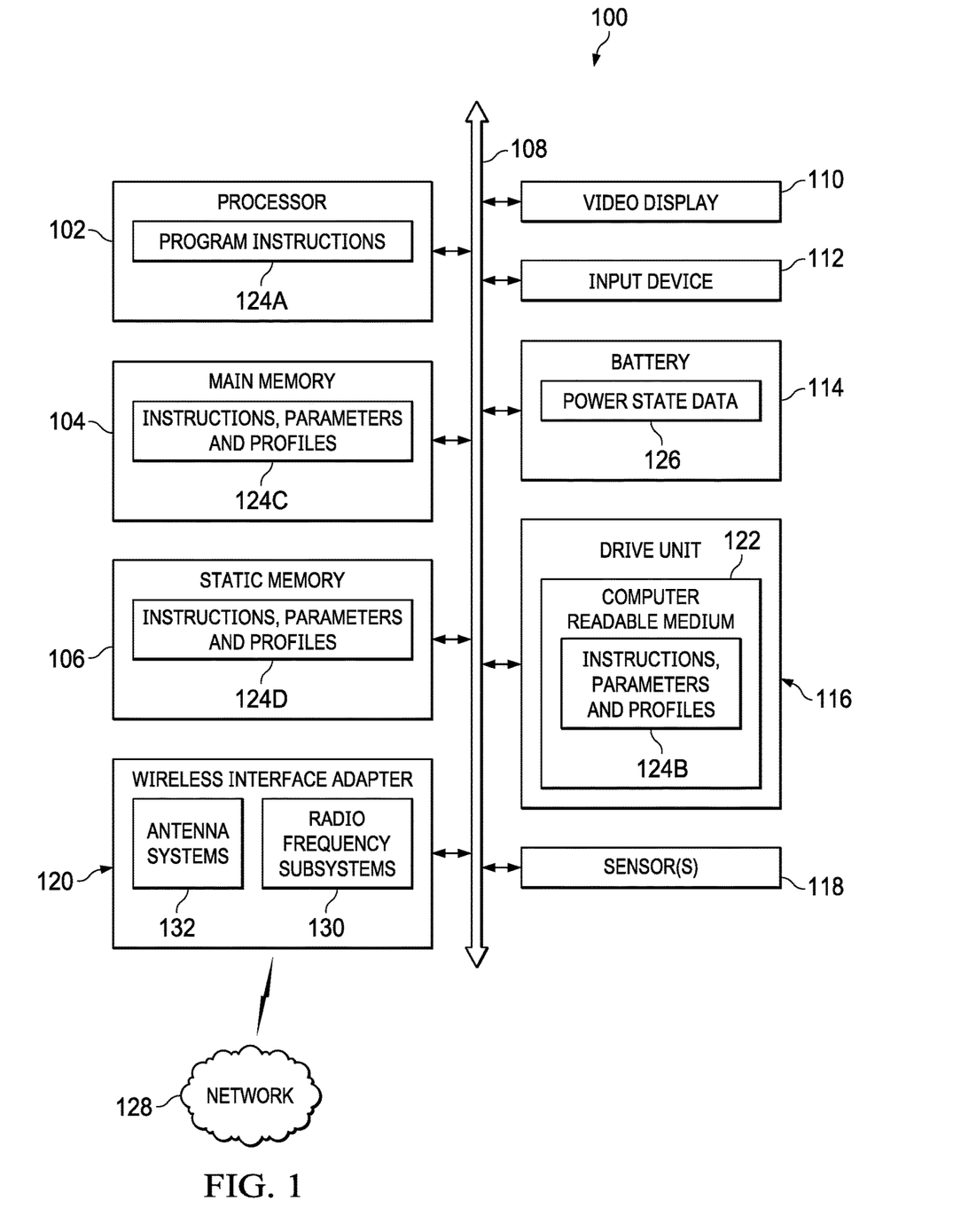
FIG. 1 is block diagram of an example of components of an Information Handling System (IHS) configured to provide crowdsourced network identification and switching, according to some embodiments.

FIG. 1 is block diagram of an example of components of an Information Handling System (IHS) configured to implement systems and methods for providing crowdsourced network identification and switching. In some embodiments IHS 100 may represent wireless communication devices 210, 220, and 230 or servers or systems 290 located anywhere within network 200 of FIG. 2, including remote data center 286.

In a networked deployment, IHS 100 may operate in the capacity of a server or as a client user computer in a server-client user network environment, or as a peer computer system in a peer-to-peer (or distributed) network environment. IHS 100 may also be implemented as or incorporated into various devices, such as a personal computer (PC), a tablet PC, a set-top box (STB), a PDA, a mobile IHS, a palmtop computer, a phone, a watch, a laptop computer, a desktop computer, a communications device, a wireless telephone, a land-line telephone, a control system, a camera, a scanner, a facsimile machine, a printer, a pager, a personal trusted device, a web appliance, an access point, a network router, switch or bridge, or any other machine capable of executing a set of instructions (sequential or otherwise) that specifies actions to be taken by that machine.

Generally speaking, IHS 100 may represent a wireless communication device (e.g., a phone, a tablet, a watch, a laptop, etc.) associated with a user or recipient of intended wireless communication. The wireless communication device may execute instructions via a processor to produce a system for classifying network traffic to use cellular network slices. The system may operate as a software agent, in whole or in part, on the wireless communication device. IHS 100 may also represent a networked server or other system and administer aspects of the system including a concurrent wireless link optimization system via instructions executed on a processor.

As shown in FIG. 1, IHS 100 may include processor 102 such as a central processing unit (CPU), a graphics processing unit (GPU), or both. Moreover, IHS 100 can include main memory 104 and a static memory 106 that can communicate with each other via bus 108. As shown, IHS 100 may further include video display unit 110, such as a liquid crystal display (LCD), an organic light emitting diode (OLED), a flat panel display, a solid-state display, or other type of display system. Display 110 may include a touch screen display module and touch screen controller (not shown) for receiving user inputs to IHS 100. In some implementations, two displays may be coupled to each other via a hinge or the like.

Additionally, IHS 100 may include input device 112, such as a keyboard, and a cursor control device, such as a mouse or touchpad or similar peripheral input device. IHS 100 may also include a power source such battery 114 or an A/C power source. IHS 100 may also include disk drive unit 116 and sensor(s) 118. IHS 100 may include a network interface device such as wireless adapter 120. IHS 100 may also represent a server device whose resources can be shared by multiple client devices, or it can represent an individual client device, such as a desktop personal computer, a laptop computer, a tablet computer, or a mobile smartphone.

IHS 100 may include program instructions that can be executed by processor 102 to cause the computer system to perform any one or more of the methods or operations disclosed herein. For example, instructions 124A, upon execution, may provide crowdsourced network identification and switching.

Various software modules comprising program instructions 124A may be coordinated by an OS via an application programming interface (API). Examples of OSs may include WINDOWS, ANDROID, and other OS types known in the art. Examples of APIs include, but are not limited to: Win 32, Core Java API, or Android APIs. In a further example, processor 102 may conduct monitoring and processing of wireless communication device usage trends by IHS 100.

Disk drive unit 116 may include computer-readable medium 122 in which one or more sets of instructions 124B such as software can be embedded. Similarly, main memory 104 and static memory 106 may also contain computer-readable medium for storage of one or more sets of instructions, parameters, or profiles 124D. Disk drive unit 116 and static memory 106 also contain space for data storage. Further, instructions 124B may embody one or more of the methods or logic as described herein.

Wireless link quality or conditions may be monitored and measured by processor 102 during wireless link usage and stored. In a particular embodiment, instructions, parameters, and profiles 124C may reside completely, or at least partially, within main memory 104, static memory 106, and/or disk drive 116 during execution by processor 102. Main memory 104 and processor 102 may also include computer-readable media. Battery 114 may include a smart battery system that tracks and provides power state data 126. This power state data may be stored with instructions, parameters, and profiles 124C.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency (RF) subsystems 130 with transmitter/receiver circuitry, wireless controller circuitry, amplifiers and other circuitry for wireless communications. Each RF subsystem 130 may communicate with one or more wireless technology protocols. RF subsystem 130 may contain individual subscriber identity module (SIM) profiles for each technology service provider and their available protocols. Alternatively, it may have a software-based SIM profile that is reconfigurable, or an eSIM for electronic control over an active SIM profile being used. Wireless adapter 120 may also include antenna system 132 which may include tunable antenna systems.

In some cases, wireless adapter 120 may operate two or more wireless communication links. For example, wireless adapter 120 may operate the two or more wireless communication links with a single, shared communication frequency band such as with the 5G standard relating to unlicensed wireless spectrum for small cell 5G next gen operation or for unlicensed Wi-Fi WLAN operation. For instance, a 5 GHz wireless communication frequency band may be apportioned under the 5G standards for communication on either small cell WWAN wireless link operation or Wi-Fi WLAN operation. In another example, wireless adapter 120 may operate a wireless communication link or links in unlicensed spectrum in 4.5G using protocols such as Licensed Assisted Access (LAA) or enhanced LAA (eLAA). In some embodiments, shared or aggregated wireless communication link(s) may be transmitted through one or a plurality of antennas.

In other cases, IHS 100 operating as a wireless communication device may operate a plurality of wireless adapters 120 for concurrent radio operation in one or more wireless communication bands. The plurality of wireless adapters 120 may further share a wireless communication band in some disclosed embodiments.

Wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Wireless adapter 120 may represent an add-in card, wireless network interface module that is integrated with a main board of HIS 100 or integrated with another wireless network interface capability, or any combination thereof.

In an embodiment, wireless adapter 120 may include one or more RF subsystems 130 including transmitters and wireless controllers for connecting via a multitude of wireless links. IHS 100 may have an antenna system transmitter 132 for 5G small cell WWAN, Wi-Fi WLAN or WiGig connectivity and one or more additional antenna system transmitters 132 for macro-cellular communication. RF subsystems 130 include wireless controllers to manage authentication, connectivity, communications, power levels for transmission, buffering, error correction, baseband processing, and other functions of wireless adapter 120.

RF subsystems 130 of wireless adapter 120 may measure various metrics relating to wireless communication pursuant to operation of a context aware radio resource management system. For example, the wireless controller of RF subsystem 130 may manage detecting and measuring received signal strength levels, bit error rates, signal to noise ratios, latencies, packet loss, congestion, contention, jitter, and other metrics or indicators relating to signal quality and strength. In an embodiment, a wireless controller may manage one or more RF subsystems 130 within wireless adapter 120.

The wireless controller also manages transmission power levels which directly affect RF subsystem power consumption. To detect and measure power consumption by RF subsystem 130, RF subsystem 130 may implement current and voltage measurements of power.

The wireless network may have a wireless mesh architecture in accordance with mesh networks described by the wireless data communications standards or similar standards. Wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In accordance with various embodiments, a computer-readable medium may include instructions, parameters, and profiles or it may receive and execute instructions, parameters, and profiles responsive to a propagated signal; so that a device connected to network 128 can communicate voice, video, or data over the network 128. Further, program instructions may be transmitted or received over the network 128 via the network interface device or wireless adapter 120.

IHS 100 includes Basic Input/Output System and firmware (BIOS/FW) code (e.g., instructions 124C in static memory 106). BIOS/FW code functions to initialize IHS 100 on power up, to launch an operating system, and to manage input and output interactions between the operating system and the other elements of IHS 100. In an embodiment, BIOS/FW code resides in memory 104, and includes machine-executable code that is executed by processor 102 to perform various operations of IHS 100.

In another embodiment, application programs and BIOS/FW code reside in another storage medium of IHS 100. For example, application programs and BIOS/FW code can reside in drive 116, in a ROM associated with IHS 100, in an option-ROM associated with various devices of IHS 100, in storage system 107, in a storage system associated with network channel of a wireless adapter 120, in another storage medium of IHS 100, or a combination thereof. Application programs and BIOS/FW code can each be implemented as single programs, or as separate programs carrying out the various operations described herein.

In some embodiments, a computer-readable medium may include a solid-state memory such as a memory card or other package that houses one or more non-volatile read-only memories. Further, a computer-readable medium may be a random-access memory or other volatile re-writable memory. Additionally, a computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment.

Sensors 118 may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration, bag state (in or out of a bag), and/or lid sensor(s) (open or closed). In some cases, one or more sensors 118 may be a part of a keyboard or other input device 112. Processor 102 may be configured to process information received from sensors 118 and to perform context-based network traffic classification operations using cellular network slices.

For instance, during operation, the user may open, close, flip, swivel, or rotate display 110 to produce different IHS postures. In some cases, processor 102 may be configured to determine a current posture of IHS 100 using sensors 118. For example, in a dual-display IHS implementation, when a first display 110 (in a first IHS portion) is folded against a second display 110 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait). For each posture and/or hinge angle, processor(s) 201 may perform a different crowdsourced network identification and switching.

For example, in a laptop posture, a first display surface of a first display 110 may be facing the user at an obtuse angle with respect to a second display surface of a second display 110 or a physical keyboard portion. In a tablet posture, a first display 110 may be at a straight angle with respect to a second display 110 or a physical keyboard portion. And, in a book posture, a first display 110 may have its back resting against the back of a second display 110 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

Moreover, sensors 118 may be used to detect the presence or distance of the user with respect to IHS 100 and/or display 110. In these cases, processor 102 may process user presence data received by sensors 118 and may determine, for example, whether an IHS's end-user is present or absent.

In situations where the end-user is present before IHS 100, processor 102 may further determine a distance of the end-user from IHS 100 continuously or at pre-determined time intervals. The detected or calculated distances may be used by processor 102 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 110.

More generally, in various implementations, processor 102 may receive IHS context information using sensors 118 including one or more of, for example: user's presence state (e.g., present, near-field, mid-field, far-field, absent), IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user is operating the keyboard is typing with one or two hands (e.g., holding a stylus, or the like), a time of day, software application(s) under execution in focus for receiving keyboard input, whether IHS 100 is inside or outside of a carrying bag, etc. Moreover, one or more different network identification and switching operations may be performed based on this context information.

In various embodiments, IHS 100 may not include all of the components shown in FIG. 1. Additionally, or alternatively, IHS 100 may include components in addition to those shown in FIG. 1. Additionally, or alternatively, components represented as discrete in FIG. 1 may be integrated with other components. For example, all or a portion of the functionality provided by the illustrated components may be implemented in a System-On-Chip (SOC), or the like.

Figure 2:
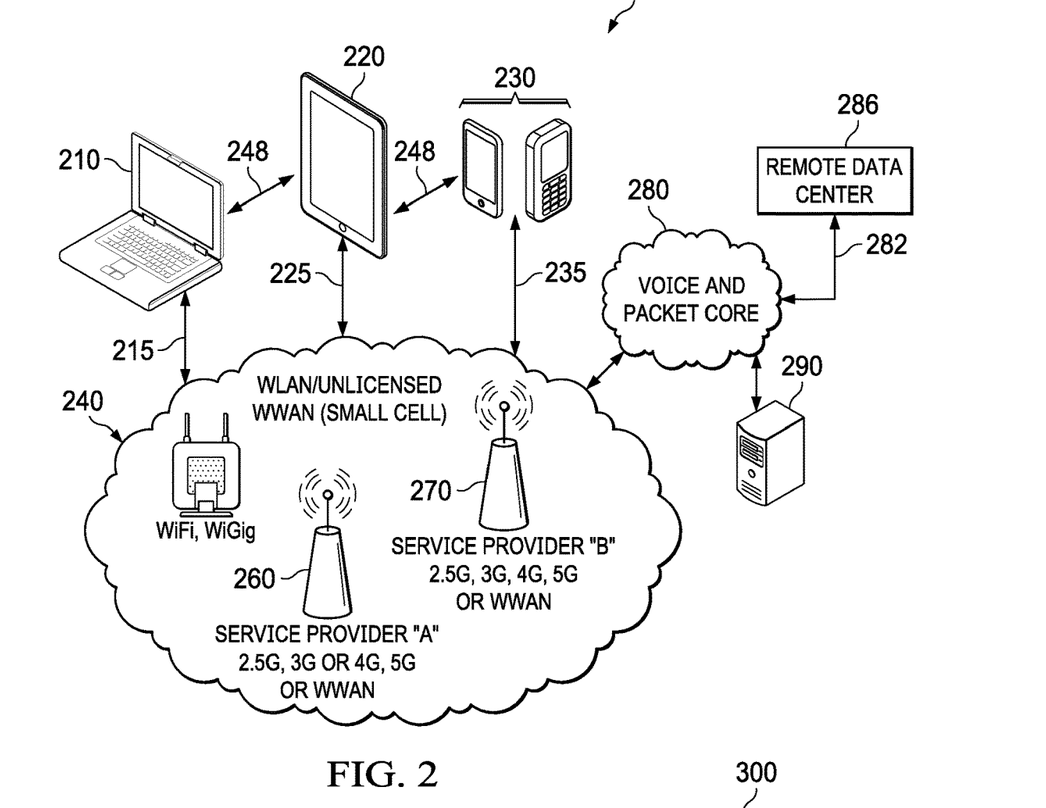
FIG. 2 is block diagram of a network environment where systems and methods for providing crowdsourced network identification and switching may be implemented, according to some embodiments.

FIG. 2 is block diagram of a network environment where systems and methods for providing crowdsourced network identification and switching may be implemented. In some embodiments, network 200 may include networked wireless communication devices 210, 220, and 230, wireless network access points, and multiple wireless connection link options. Network 200 may include one or more wired communication devices or links. For example, communication device 210 may include a wired link, such as an Ethernet link. A variety of additional computing resources of network 200 may include client mobile information handling systems, data processing servers 290, network storage devices, local and wide area networks, or other resources as needed or desired.

As depicted, IHSs 210, 220, and 230 may be a laptop computer, tablet computer, or smartphone device. Wireless communication devices 210, 220, and 230 may access a wireless local network 240, or they may access a macro-cellular network 250. In a further example, IHS 230, such as a laptop, may alternatively access local network 240 using a wired link, such as a wired Ethernet connection. In an example, the wireless local network 240 may be the wireless local area network (WLAN), a wireless personal area network (WPAN), or a wireless wide area network (WWAN).

In an embodiment, a standalone mobile IHS 210, 220, or 230 may operate on WLAN such as Wi-Fi or on unlicensed WWAN small cell wireless links such as with small cell unlicensed LTE substations in wireless local network 240. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols.

Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like.

In some embodiments, networked wireless communication devices 210, 220, or 230 may have a plurality of wireless network interface systems capable of transmitting simultaneously within a shared communication frequency band. Communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Examples of competing protocols may be local wireless network access protocols such as Wi-Fi, WiGig, and small cell WLAN in an unlicensed, shared communication frequency band. Examples of communication frequency bands may include unlicensed 5 GHz frequency bands or 2.5 GHz conditional shared communication frequency bands under FCC Part 96. Wi-Fi ISM frequency bands that could be subject to future sharing include 2.4 GHz, 60 GHz, 900 MHz or similar bands.

Voice and packet core network 280 may contain externally accessible computing resources and connect to a remote data center 286. Voice and packet core network 280 may contain multiple intermediate web servers or other locations with accessible data. Voice and packet core network 280 may also connect to other wireless networks similar to 240 or 250 and additional wireless communication devices such as 210, 220, 230 or similar connected to those additional wireless networks.

Connection 282 between wireless network 240 and remote data center 286 or connection to other additional wireless networks may be via Ethernet or another similar connection to the world-wide-web, a WAN, a LAN, another WLAN, or other network structure. Connection 282 may be made via a WLAN access point/Ethernet switch to the external network and be a backhaul connection.

The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network-connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In various implementations, cloud or remote data center 286 or networked server 290 may run hosted applications for systems 210, 220, and 230. For example, remote data center 286, networked server 290, or some combination of both may operate some or all of a plurality of hosted applications. Wireless communication devices 210, 220, and 230 may be configured to run one or more applications locally, and to have hosted applications run in association with the local applications at remote data center 286 or networked server 290. For example, wireless communication devices 210, 220, and 230 may operate some or all of the hosted applications on a remote server via local area network connectivity using crowdsourced network identification and switching.

Thus, as illustrated, systems 210, 220, and 230 may be running applications locally while requesting data objects related to those applications from the remote data center 286 via a wireless network. For example, a data storage client application such as Microsoft Sharepoint may run on system 220, and it may be associated with a host application running at remote data center 286 that represents a Sharepoint data storage server. In another example, a web browser application may be operating at system 230, and it may request web data from a host application that represents a hosted website and associated applications running at remote data center 286.

Although 215, 225, and 235 are shown connecting wireless adapters of wireless communication devices 210, 220, and 230 to wireless networks 240 or 250, actual wireless communication may link through a wireless access point (Wi-Fi or WiGig), through unlicensed WWAN small cell base stations such as in network 240 or through a service provider tower such as that shown with service provider A 260 or service provider B 270 and in network 250.

In other cases, wireless communication devices 210, 220, and 230 may communicate intra-device via 248 when one or more of wireless communication devices 210, 220, and 230 are set to act as an access point or a WWAN connection via small cell communication or licensed small cell WWAN connections. For example, one of wireless communication devices 210, 220, and 230 may serve as a Wi-Fi hotspot.

Quality-of-Service (QoS), bandwidth, time-of-flight (e.g., following the Fine Time Measurement or "FTM" protocol), and/or speed of wireless links 215, 225, and 235—that is, a link's capabilities—may vary widely depending on several factors including the service provider, the number of wireless communication devices and users in a location, and other factors. Thus, selection of a wireless link among local area network links such as WLAN links may depend on assessment of the link radio frequency conditions. The wireless communication device's operating context can play an important role in determining wireless link conditions. Information about wireless link connection quality and capacity for a service to be used can be advantageous in optimizing traffic classification, cellular network slice selection, and/or multi-link aggregation.

Often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. These factors can be specific to the type of wireless service being requested, whether voice, messaging, SMTP, Audio, Video, HTTP or other service types. They can also be specific to the wireless communication device used. In each instance, radio frequency transmission subsystems and controllers operate and consume device power. Based at least in part on these, and other factors, systems and methods described herein may perform crowdsourced network identification and switching.

Figure 3:
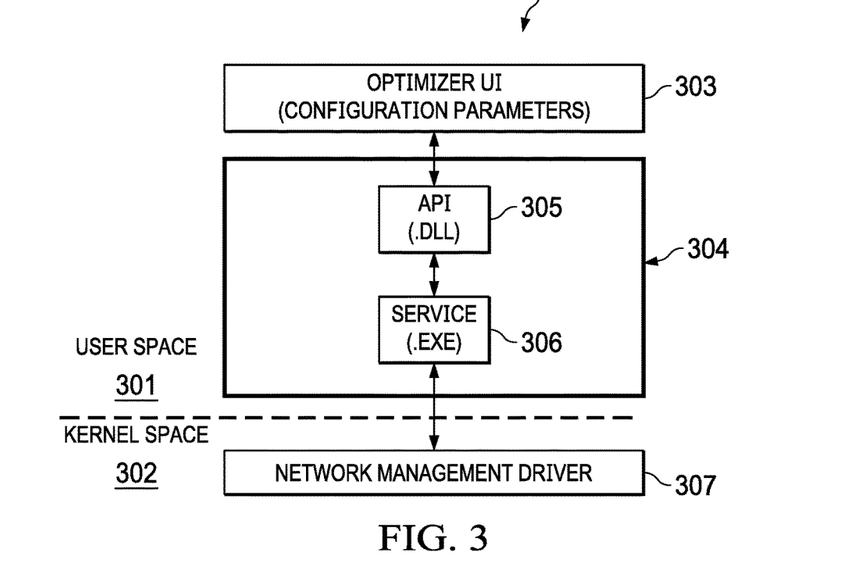
FIG. 3 is a block diagram of a crowdsourced network identification and switching software system, according to some embodiments.

FIG. 3 is a block diagram of a crowdsourced network identification and switching software system 300. In some embodiments, system 300 may be instantiated through the execution of program instructions 124A by processor 102 of IHS 100, as local IHS and/or as a remote crowdsourced network identification and switching server. As shown, optimizer user interface (UI) 303 may provide a graphical UI (GUI) in user space 301 configured to receive one or more configuration parameters. For example, optimizer UI 303 may receive, as configuration parameters, a user's selection of QoS indicator(s), threshold(s), and/or context information (e.g., application type, proximity-based, posture-based, etc.), usable by system 300 to determine when and/or how to effect crowdsourced network identification and switching in IHS 100.

Optimizer UI passes configuration parameters to OS plug-in module 304, which includes API 305 (a dynamic-link library or DLL, etc.) and OS service 306 (e.g., an executable). In some implementations, OS service 306 may be configured to handle network traffic classification in user space 301. In kernel space 302, network management driver 307 (e.g., a network filter driver deployed as part of the Windows Filtering Platform (WFP)) may be configured to perform load balancing of packets for cellular network slices under control of OS service 306, according to the configuration parameters received via optimizer UI 303.

In some implementations, system 300 may include machine learning (ML) and/or artificial intelligence (AI) algorithms configured to collect context information such as, for example, RSSI from various APs, ToF from various APs, physical location information (e.g., by GPS), accelerometer data, etc. Software 300 may also include ML and/or AI algorithms configured to store and analyze other context information indicative of user behavior, such applications under execution and their priorities, distance between the user and the IHS, IHS posture or hinge angle, bag status, etc. Moreover, software 300 may be configured to use such information to perform crowdsourced network identification and switching operations that are specific to that context.

Figure 4:
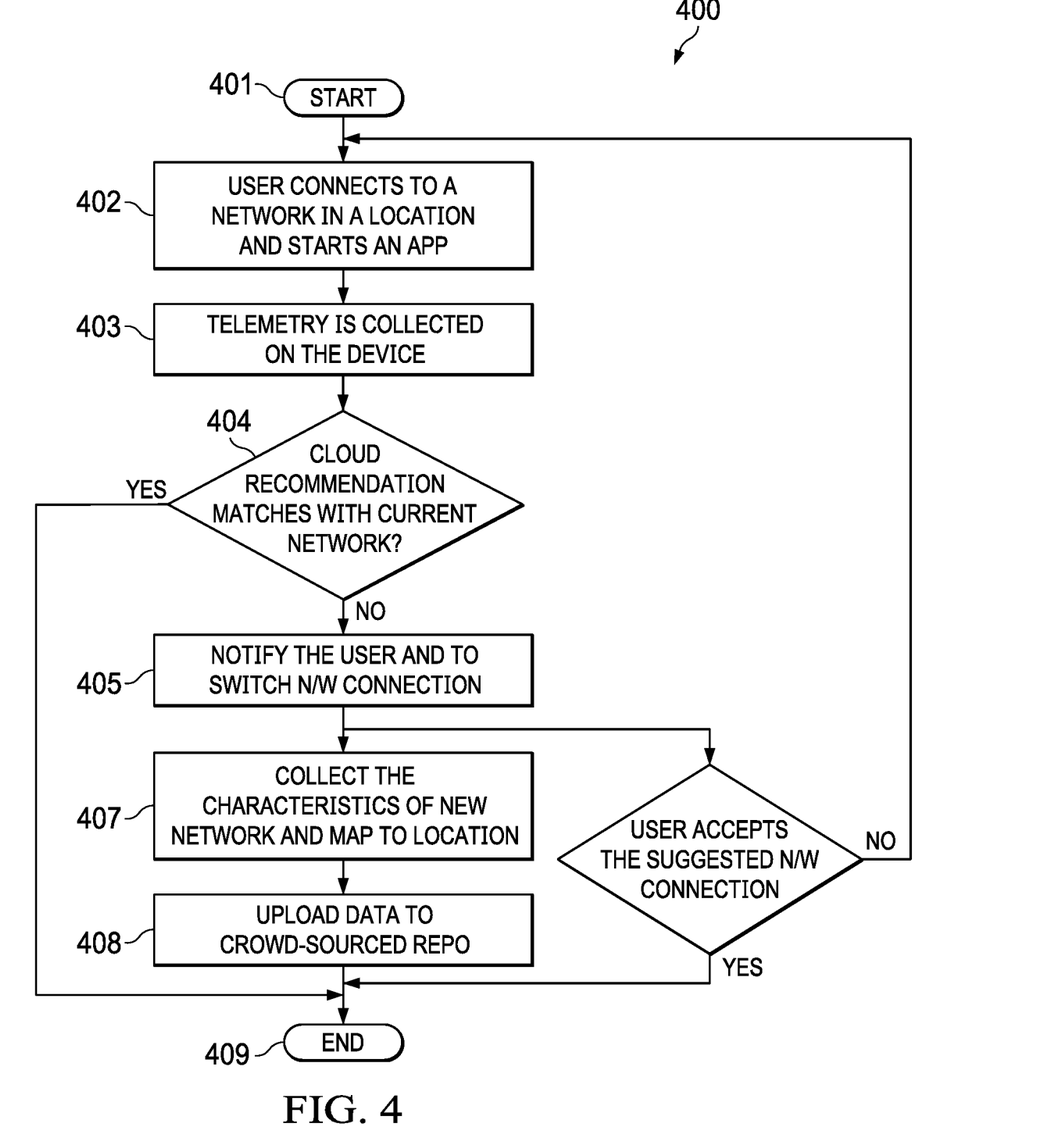
FIG. 4 is a flowchart of an example of a method for providing crowdsourced network identification and switching, according to some embodiments.

FIG. 4 is a flowchart of an example of method 400 for providing crowdsourced network identification and switching. In some embodiments, method 400 may be performed by one or more IHSs 100 implementing software 400 of FIG. 4 as part of system 500 of FIG. 5. Particularly, method 400 begins at block 401.

Figure 5:
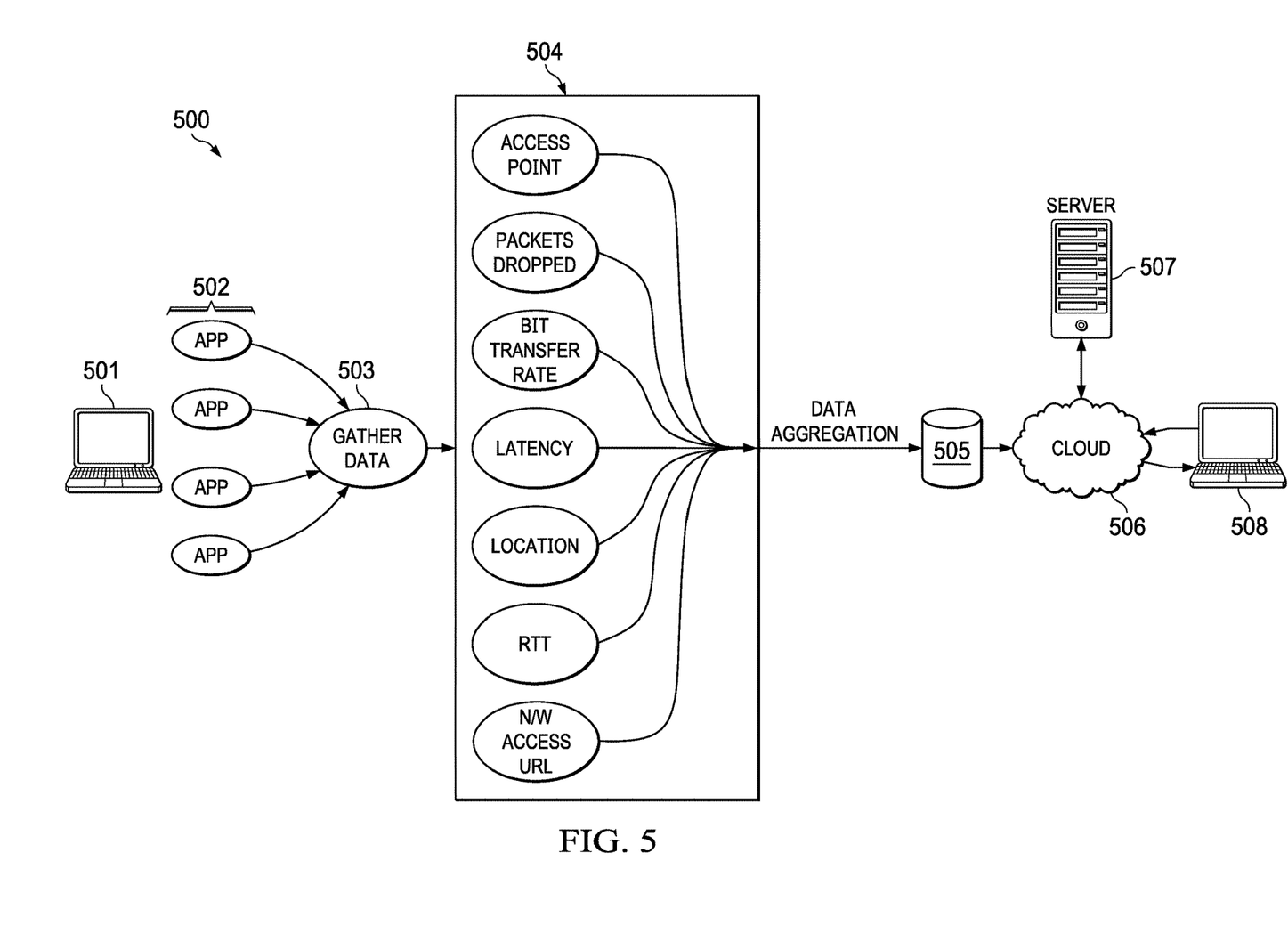
FIG. 5 is a diagram of an example of a system for providing crowdsourced network identification and switching, according to some embodiments.

At block 402, a user operating IHS 501 connects to a first network from a given location (e.g., a geographic location, the location of an office inside a building, etc.) and starts one or more applications 502. Then, at block 403, method 400 collects telemetry data and context information from device 501.

With reference to FIG. 5, examples of telemetry data include, network characteristics 504 gathered by IHS 501 at block 503 may include, but are not limited to, throughput, packet size, latency, round-trip time (RTT), Received Signal Strength Indicator (RSSI), bit error rate, access point identification, network access address, security protocol, number of packets dropped, bit transfer rate, location, network Uniform Resource Locator (URL), type of traffic (e.g., video, audio, or data), etc.

Conversely, examples of context information include, but are not limited to, an application identification, an application state (e.g., foreground, background, etc.), a user's presence state, time-of-day, IHS location, IHS movement, lid state, hinge angle, IHS posture, power consumption, whether the IHS is coupled to a dock or docking station, a distance between the user and at least one of: the IHS, the keyboard, or a display coupled to the IHS, a type of keyboard, whether the user operating the keyboard is typing with one or two hands, a time of day, software application(s) under execution in focus for receiving keyboard input, whether the IHS is inside or outside of a carrying bag, etc.

Back to block 403, telemetry data and context information are collected and aggregated in database 505, and then transmitted to crowdsourcing server 507 over network or cloud 506. Server 507 receives data from IHS 501, as well as other IHSs, and determines, based upon crowdsourced data—that is, other telemetry data and context information from other IHSs—whether the first network originally selected by the user of IHS 501 at block 402 matches its recommendation of best-suited network for providing a selected QoS, throughput, security, or the like, to match application 502's requirements.

At block 404, if the first network is the best-suited network for application 502 at the IHS's location, according to server 507, then method 400 ends a block 409. Otherwise, at block 405, IHS 501 receives a message from crowdsourcing server 507 to switch from the first network to a second network connection. Crowdsourcing server 507 is configured to receive other data and information from other IHSs and to select the second network in response to a determination that the second network accommodates traffic generated by application 502 at the given location with a higher Quality-of-Service (QoS) than the first network (the determination is based at least in part upon an evaluation of the other characteristics received from the other IHSs).

If the user accepts the new connection at block 406, method 400 ends a block 409. If not, control returns to block 402. In some cases, to switch from the first network to the second network, IHS 501 may receive an identification of an access point associated with the second network.

After notifying the user to switch network connection at block 405, method 400 proceeds to block 407, where it collects new telemetry data from the second network and maps that new data to the IHS's location and/or new context information. At block 408, the newly collected data is transmitted to cloud server 507, which analyzes that data (e.g., using an ML or AI algorithm) to create other crowdsourced network switching recommendations for other users 508.

In some implementations, method 400 may be performed continuously or periodically such that, when network management driver 307 detects a change in a characteristic of the second network, a state of the application, or a current location, it transmits an indication of the change to crowdsourcing server 507, and in response it receives another message from the crowdsourcing server to switch from the second network to the first network or to a third network.

As such, embodiments of the various systems and methods described herein may: identify a best access point and/or cellular network available to a user in their present context; crowdsource the mapping between available networks and application traffic patterns; apply feedback based-Supervised learning approach on the statistics collected by various users based on geo-location, time-of-day, visible access points, etc.; detect network resources used by applications using data from different IHS; detect and connect to the best available network for the application the user is accessing.

As an example of a use-case, consider a user working on an office application in a coffee shop. First, collection of telemetry is enabled on the user's device. Second, the following application telemetry is tracked when the user downloads a file from a remote server: round trip time (RTT), dropped packets, bandwidth, WiFi access point RSSI, 2.4 GHz/5 GHz/Cellular, geographic information, and AP name/cellular connection. This telemetry data is pushed to a crowdsourcing repository.

When the user launches an application and starts editing the downloaded file, an additional set of application telemetry data and context information may be tracked, in this example: network activity of application, network access URL, and power consumption of the device. The new application telemetry data is pushed to the crowdsourcing repository. The cloud collects information from various users and learns the best network based upon the location of the user, the time-of-day, user application requirements (e.g., security, throughput, QoS, etc.). For instance, the crowdsourced data may be used to run a supervised algorithm that divide the data into n classes ("n" being the number of networks around in a particular radius of geo location). When a new user starts an application, this user is mapped to a class based upon the degree of similarity between its context and that of other IHSs.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
collect characteristics of a first network accessed by an application executed by the IHS at a given location;
transmit information related to the characteristics, the application, the location, and at least one of: time-of-day information, power consumption information, or a user's physical distance from the IHS to a crowdsourcing server, wherein the crowdsourcing server is configured to select a second network based, at least in part, upon at least one of: the time-of-day information, the power consumption information, or the user's physical distance from the IHS; and
receive a message from the crowdsourcing server to switch from the first network to the second network.

2. The IHS of claim 1, wherein the first and second networks are selected from the group consisting of: a WiFi network, an Ethernet network, and a cellular network.

3. The IHS of claim 1, wherein the characteristics are selected from the group consisting of: throughput, packet size, latency, round-trip time (RTT), Received Signal Strength Indicator (RSSI), bit error rate, access point identification, network access address, and security protocol.

4. The IHS of claim 1, wherein to switch from the first network to the second network, the program instructions, upon execution, cause the IHS to receive an identification of an access point associated with the second network.

5. The IHS of claim 1, wherein the crowdsourcing server is configured to receive other characteristics from other IHSs and to select the second network in response to a determination that the second network accommodates traffic generated by the application at the given location with a higher Quality-of-Service (QoS) than the first network, wherein the determination is based at least in part upon an evaluation of the other characteristics received from the other IHSs.

6. The IHS of claim 1, wherein the program instructions, upon execution, further cause the IHS to: transmit IHS posture information to the crowdsourcing server, wherein the crowdsourcing server is configured to select the second network based, at least in part, upon the IHS posture information.

7. The IHS of claim 1, wherein the program instructions, upon execution, further cause the IHS to:
detect a change in at least one of: a characteristic of the second network, a state of the application, or a current location;
transmit an indication of the change to the crowdsourcing server; and
receive another message from the crowdsourcing server to switch from the second network to: the first network or a third network.

8. A memory device having program instructions stored thereon that, upon execution by a processor of a crowdsourcing server, cause the crowdsourcing server to:
receive characteristics of a first network accessed by an application executed by an Information Handling System (IHS) at a given location;
receive other characteristics from other IHSS;
select a second network in response to a determination that the second network accommodates traffic generated by the application from the given location with a higher Quality-of-Service (QoS) than the first network, wherein the determination is based at least in part upon an evaluation of the other characteristics; and
transmit a message to the IHS to switch from the first network to the second network.

9. The memory device of claim 8, wherein the first and second networks are selected from the group consisting of: a WiFi network, an Ethernet network, and a cellular network.

10. The memory device of claim 8, wherein the characteristics are selected from the group consisting of: throughput, packet size, latency, round-trip time (RTT), Received Signal Strength Indicator (RSSI), bit error rate, access point identification, network access address, and security protocol.

11. The memory device of claim 8, wherein the program instructions, upon execution, further cause the crowdsourcing service to:
receive at least one of: time-of-day information, power consumption information, IHS posture information, or a user's physical distance from the IHS to the crowdsourcing server; and
select the second network based, at least in part, upon the at least one of: the time-of-day information, the power consumption information, the IHS posture information, or the user's physical distance from the IHS.

12. The memory device of claim 8, wherein the program instructions, upon execution, further cause the crowdsourcing server to:
receive an indication of a change in at least one of: a characteristic of the second network, the application, or the given location; and
transmit another message to the IHS to switch from the second network to: the first network or a third network.

13. A method, comprising:
receiving, at a crowdsourcing server from an Information Handling System (IHS), characteristics of a first network accessed by an application executed by the IHS at a given location;
transmitting, from the crowdsourcing server to the IHS, an instruction to switch from the first network to a second network;
receiving, at the crowdsourcing server, an indication of a change in at least one of: a characteristic of the second network, a state of the application, or a current location; and
transmitting, from the crowdsourcing server to the IHS, another message to switch from the second network to: the first network or a third network.

14. The method of claim 13, further comprising:
receiving, by the crowdsourcing server, other characteristics from other IHSs; and
selecting the second network in response to a determination that the second network accommodates traffic generated by the application from the given location with a higher Quality-of-Service (QoS) than the first network.

15. The method of claim 13, further comprising:
receiving, by the crowdsourcing server, at least one of: time-of-day information, power consumption information, IHS posture information, or a user's physical distance from the IHS; and
selecting the second network based, at least in part, upon the at least one of: the time-of-day information, the power consumption information, the IHS posture information, or the user's physical distance from the IHS.

* * * * *